Nov. 20, 1934.  W. E. SOMERVILLE  1,981,083
WIRE ROPE AND CABLE MAKING MACHINE
Filed March 25, 1931  7 Sheets-Sheet 1

Inventor
William E. Somerville
By ............ Atty.

Nov. 20, 1934.  W. E. SOMERVILLE  1,981,083
WIRE ROPE AND CABLE MAKING MACHINE
Filed March 25, 1931  7 Sheets-Sheet 4

Inventor
William E. Somerville
By [signature] Atty.

Nov. 20, 1934.  W. E. SOMERVILLE  1,981,083
WIRE ROPE AND CABLE MAKING MACHINE
Filed March 25, 1931  7 Sheets-Sheet 6

Nov. 20, 1934.  W. E. SOMERVILLE  1,981,083
WIRE ROPE AND CABLE MAKING MACHINE
Filed March 25, 1931   7 Sheets-Sheet 7

Inventor
William E. Somerville.

Patented Nov. 20, 1934

1,981,083

UNITED STATES PATENT OFFICE 1,981,083

WIRE ROPE AND CABLE MAKING MACHINE

William E. Somerville, Coal City, Ill.

Application March 25, 1931, Serial No. 525,201

7 Claims. (Cl. 117—16)

This invention relates to improvements in wire rope or cable making machines, and one of the objects of the invention is to provide an improved machine of this character in which the take up reel and draw-off, sometimes called "haul off" mechanism are mounted in a cradle which revolves to twist the wires into a cable or strand, the reels or bobbins which hold the wires from which the cable or strand is formed, being rotatable about their own axes at any desired rate of speed with reference to the speed of rotation of the cradle about its axis.

A further object is to provide in an improved machine of this character means whereby the strands or wires may be rotated at any desired rate of speed with respect to the cradle, that is, faster than the cradle, or slower than the cradle, as may be desired, to produce a wire rope or cable with or without life, with the result that the hardest wire may be twisted without the serious stresses usually produced in other machines of this character.

It has been found that with many of the high speed twisting machines now in use, it is practically impossible to produce a cable or strand composed of more than seven wires, which is first-class in every respect, for the reason that one of the principal and greatest defects found in some of the power machines is that the wire is twisted in one direction as it leaves the spool or bobbin, and then it is twisted in an opposite direction near the die plate.

These objections and defects have been eliminated and overcome by the present invention, as this machine will produce a flexible cable, or strand, free from inner stresses because the wire is neither twisted nor crushed in the laying thereof. The spools or bobbins carrying the wire rotate about their own axis, with the result that all centrifugal force is excluded and the capacity of the machine will depend only upon the size of the reel which receives or takes up the finished cable or strand.

A further object is to provide in a machine of this character improved means for feeding the wire rope or cable to the reel and for balancing the feeding mechanism to prevent unbalancing by the weight of the rope and the feeding or guiding means.

A further object is to provide feeding mechanism which may be adjusted for different diameters of rope or cable to be wound upon the reel.

A further object is to provide an improved machine of this character which will be of a comparatively simple and compact construction and which will be effective and efficient in operation.

To the attainment of these ends and the accomplishment of other new and useful objects as will appear, the invention consists in the features of novelty in substantialy the construction, combination and arrangement of the several parts hereinafter more fully described and claimed and shown in the accompanying drawings illustrating this invention and in which

Referring more particularly to the drawings the numeral 15 designates generally a twister cradle of any suitable size and configuration which is provided with hollow trunnions 16—17 at opposite ends thereof. These trunnions are journaled in bearings carried by suitable uprights or standards 18—19, the cradle being rotatable in bearings.

Mounted within the cradle 15 to extend thereacross is a take up reel 20 of any desired size and diameter and is removably secured in position in any suitable manner, and connected with the reel 20 is a gear 21 for rotating it. The gear 21 meshes with a gear 22, which in turn is connected with a gear 23, the latter being preferably of the beveled type.

Meshing with the gear 23 is a beveled gear 24 which is connected with a gear 25 that meshes with an idle gear 26, the latter in turn meshing with a stationary gear 27.

The gear 27 is held stationary in any suitable manner preferably by means of a band brake 28, which engages a pulley 29 connected with a shaft 30 of the gear 27, the band brake being maintained operative by means of the usual weight and lever 31.

With this construction the gear will be held by the band brake so that when the cradle 15 is rotated the train of gears which connect the gear 27 with the take up reel 20 will be rotated about their axes and this will cause a rotation of the reel 20. The band brake will, however, permit of a certain amount of slippage of the gear 27 to compensate the varying diameter of the take up reel 20 as the finished cable or strand is wound thereupon.

The finished cable or strand 32 is wound upon the reel 20 and a guide 33 is provided for laying the strand or cable in its proper position upon the reel. This guide 33 is reciprocated preferably by means of a double threaded shaft 34 which is rotated preferably from the reel 20, through the medium of a sprocket chain 35 passing over a sprocket wheel connected with the reel 20 and a sprocket wheel 35ª (see Figure 11) loosely mounted upon the shaft 34, in a manner to be described. This guide 33 is itself maintained against rotation with the shaft 34 by means of a bar or rod 36 passing therethrough and serving as a guide for the member 33.

Arranged below the shaft 34 and journaled in suitable bearings in the cradle 15 is another shaft 37 which is parallel with the shaft 34, and provided with double threads, and this shaft 37 passes through a member 38 which in turn is guided by means of a bar or rod 39 arranged below and parallel with the shaft 36.

Figure 13:
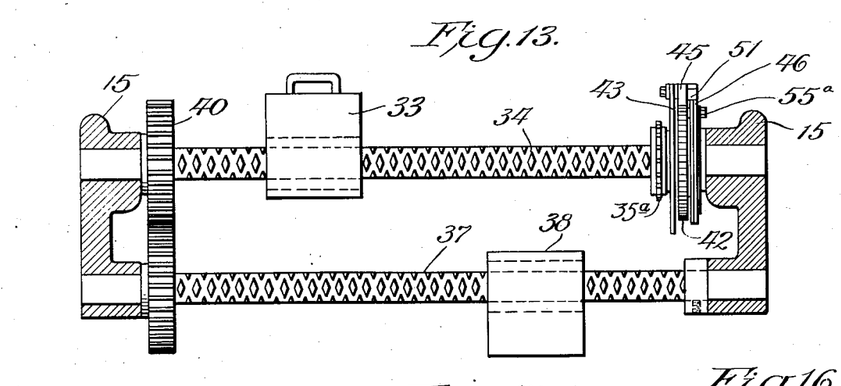
Figure 13 is a sectional view taken on line 13—13, Figure 1.
Figure 14:
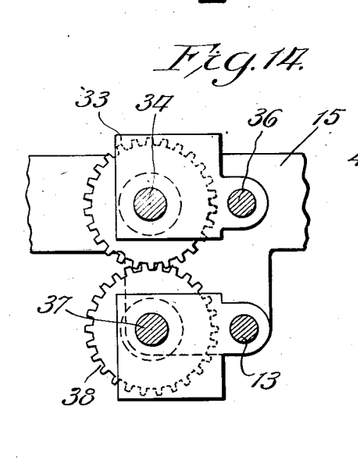
Figure 14 is a detail sectional view taken on line 14—14, Figure 1.
Figure 15:
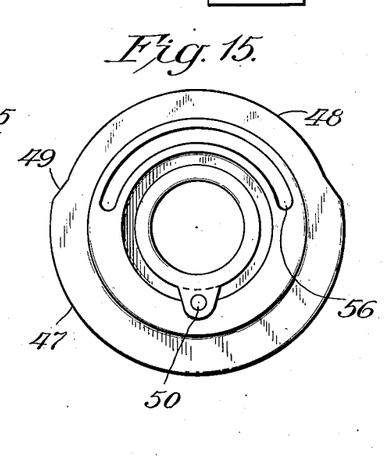
Figures 15 and 16 are elevations of the cam members for controlling the extent of rotation of the shaft for controlling the feeding of the cable to the reel.
Figure 16:
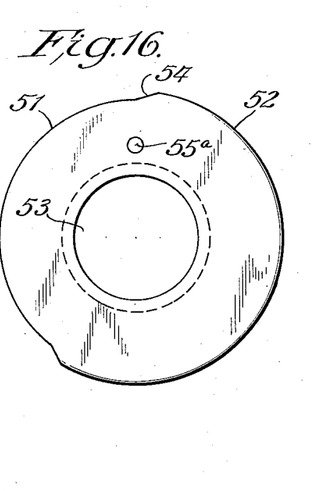

The shafts 34 and 37 are connected together for rotation in opposite directions in any desired or suitable manner, such as by means of gears 40—41 (see particularly Figure 13) secured respectively to the shafts 34 and 37 and mesh with each other so that when the shaft 34 is rotated, the guide member 33 and the member 38 will be moved by their respective shafts in opposite directions across the cradle 15 so that as the cable 32 is piled upon the reel 20 and as the guide 33 is moved to feed the cable uniformly upon the reel, the member 38 will move in the opposite direction from the guide member 33 and thereby serve as a means to counterbalance the cradle 15 to overcome the weight of the cable on the drum and the member 33 to prevent unbalancing of the mechanism.

Figure 1:
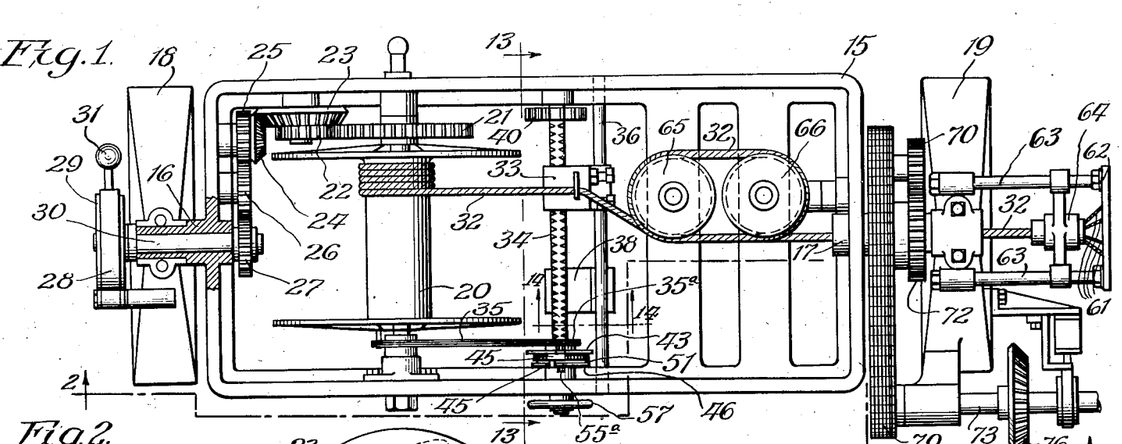
Figure 1 is a top plan view partly in section of one end of a machine constructed in accordance with the principles of this invention.
Figure 2:
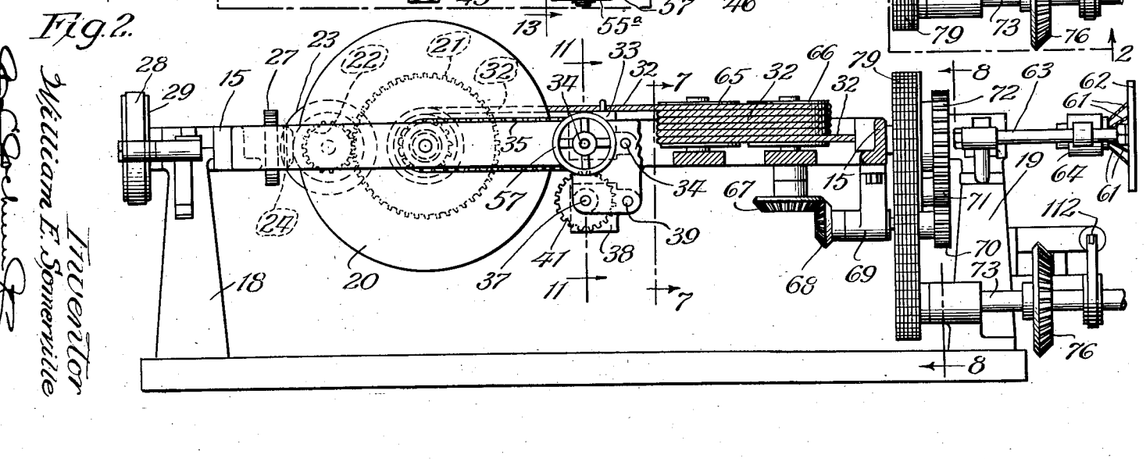
Figure 2 is a view taken on line 2—2, Figure 1, with parts broken away.
Figure 11:
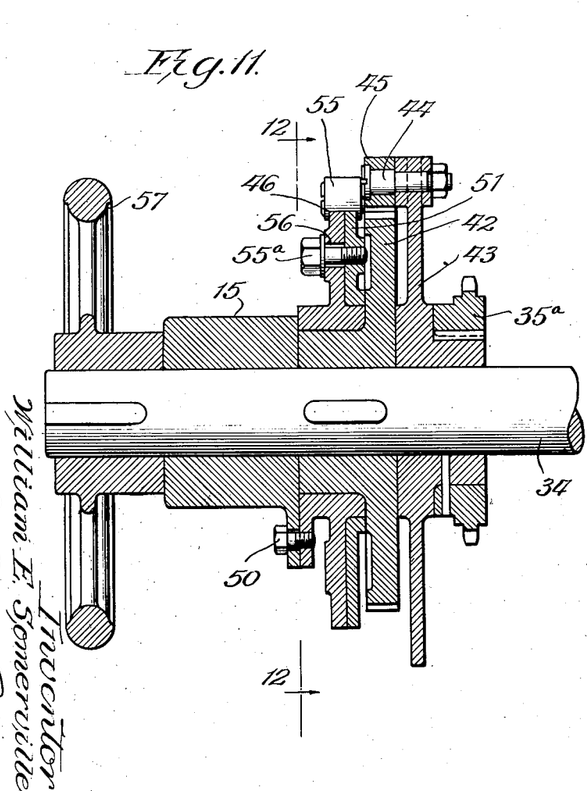
Figure 11 is a detail sectional view taken on line 11—11, Figure 2, with parts omitted.
Figure 12:
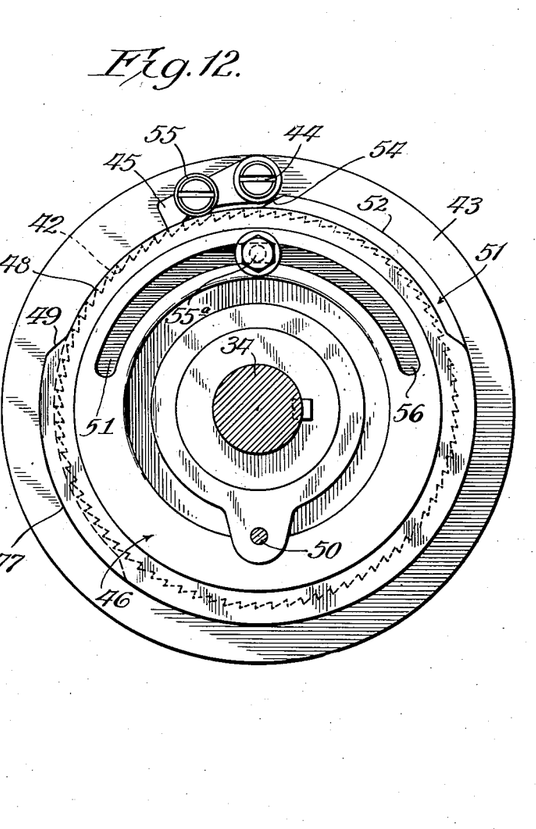
Figure 12 is a sectional view taken on line 12—12, Figure 11.

The shaft 34 and consequently the shaft 37 are intermittently rotated through the medium of the sprocket chain 35, but the extent of rotation of the shaft 34 may be varied according to the diameter of the rope or cable to be wound upon the reel, and therefore in order to impart the desired degree of rotation to the shaft 34 during each step of its movement, there is provided a ratchet wheel 42 secured to the shaft 34 for rotation therewith (see particularly Figures 1, 11 and 12). The sprocket wheel 35ª is connected with a member 43 which is rotatable about the shaft 34, and connected to the member 43 by means of a pivot 44, is a pawl or dog 45 which co-operates with the teeth of the ratchet wheel 42 so that when the pawl is in engagement with one of the teeth of the ratchet 42 and the shaft 34 rotated, the ratchet wheel 42 and consequently the shaft 34 will be rotated.

In order to cause only an intermittent rotation of the shaft 34 by the pawl and ratchet mechanism, there is provided means which will permit the pawl 45 to remain in engagement with the teeth of the ratchet 42 only during a portion of the bodily rotation of the pawl with the member 43 and with the ratchet wheel 42. Any suitable means may be provided for that purpose, but a simple and efficient means embodies a cam member 46 having a high portion 47 and a low portion 48 connected together by means of an inclined surface 49. This cam member 46 is held against rotation with respect to the shaft 34 in any suitable manner such as by means of a fastening device 50 passing through a portion of the cradle 15 and engaging the cam member 46. Co-operating with the cam member 46 is another cam member 51 which is provided with a high portion 52 and a low portion 53 connected together by means of an inclined portion 54. The cams 46 and 51 are so arranged with respect to each other that the inclined portions 49 and 54 will be opposed, with the low portions 48—53 therebetween, and the inclined portions 49—54 are spaced from each other a sufficient distance to allow the active edge of the pawl or dog 45 to engage and rest upon the teeth of the ratchet member 42, so that when the parts are in the position as shown in Figure 12, and when the member 43 is rotated through the medium of the sprocket wheel 35ª, the pawl 45 being in engagement with the teeth of the ratchet member 42, will rotate the member 42, and will thereby impart a corresponding movement or step of movement to the shaft 34. The extent of movement of the member 42 and consequently the shaft 34 is controlled by the cam members 46—51 and to the extent to which the inclined portions 49—54 respectively on the cam members are separated. As the member 43 is rotated carrying with it the ratchet member 42, the pawl 45 will remain in engagement with the ratchet teeth until the anti-friction roller 55 on the pawl engages the inclined surface 49, whereupon upon a further movement of the member 43 in the same direction the anti-friction roller 55 will ride upwardly on the surface 49 causing the roller to contact with the periphery of the high portion 47 of the cam member 46, causing the pawl to move out of engagement with the teeth of the ratchet member 42, thereby releasing the shaft 34, interrupting its rotation, while the member 43 continues to rotate with the sprocket wheel 35ª. As soon as the member 43 has traveled a sufficient distance to cause the roller 55 to pass off of the high portion 52 of the cam member 51 on to the low portion 53 thereof, the pawl 45 will again engage the teeth of the ratchet member 42 and another step of rotation during the cycle of rotation of the member 43, will be imparted to the shaft 34. It is to be understood that the low portions 48 of the cam member 46 and 53 of the cam member 51, are of such a height as to permit the pawl 45 to engage the ratchet teeth.

The cam members 46 and 51 are held in their relative adjusted position with respect to each other in any desired or suitable manner preferably by means of a fastening device 55ª in the form of a bolt which passes through a slot 56 in the member 46 and is threaded into the cam member 51. The slot 56 is of a sufficient length to permit a considerably wide range of relative adjustment between the cam members 46 and 51.

If desired, a hand wheel 57 may be connected with the shaft 34 by means of which the member 43 and dog or pawl 45 may be initially set.

Arranged at the other end of the machine is a stationary support 58 having mounted thereon a plurality of spools, reels or bobbins 59 preferably arranged about a centrally disposed reel or bobbin 60. These reels or bobbins are each mounted in a bobbin cradle 59ª and each carries the wires or strands 61 of which the finished product is made and the strands pass through a suitable die plate or die 62 supported in any suitable manner such as by means of arms 63 connected preferably with the bearing 19.

After the wires pass through the die 62 they are brought together and passed through a tubular die block 64, which latter is preferably supported by the arms 63, and from the die block the wires or strands are passed through the tubular trunnion 17 of the cradle 15. Arranged adjacent the trunnions 17 is a twisting and draw off mechanism of any desired and suitable construction, but preferably embodies spaced pulleys 65—66 arranged to rotate about axes transverse to the axis of rotation of the cradle 15. These pulleys 65—66 may be of any desired diameter and are spaced from each other for any suitable distance, and around which pulleys the wire rope or cable 32, as it passes out of the trunnion 17 of the cradle 15, is wrapped any desired number of times. The pulley 66 is positively driven while the pulley 65 rotates by means of the friction created by the rope or cable 32 passing over the pulleys and to the reel 20.

Any suitable means may be provided for driving the pulley 66 such as a gear 67 connected with the shaft of the pulley, and is preferably of the beveled type meshing with a gear 68 carried by a shaft journaled in a suitable bearing 69, mounted upon the cradle 15, and connected to the gear 68 to rotate therewith is a gear 70 which meshes with an idle gear 71, which in turn meshes with a stationary gear 72. The gear 72 encompasses the trunnion 17 of the cradle 15 and is held stationary in any suitable manner preferably by being anchored to the suport 19.

It will therefore be seen that when the cradle 15 is rotated the gears 70 and 71 will also be rotated about their axes and at the same time the gears 70 and 71 will travel about the stationary gear 72, causing the gear 68 to be rotated, which in turn will drive the gear 67 connected to the pulley 66.

As the wires 61 pass from the spools or reels 60—59, through the die plate 62 and through the die block 64, they will pass through the hollow trunnion 17 and around the draw off pulleys 65—66, which latter operate to draw off the finished product and as they draw off the strand or cable, the cradle 15 is being rotated, thereby causing the wires or strands to be twisted together between the die block 64 and the draw off mechanism.

The cradle 15 may be rotated in any suitable manner, preferably from a drive shaft 73 from a motor 74, through the medium of intermeshing gears 75—76. Connected with the shaft 73 is a gear or sprocket 77 and connected with the cradle 15 is another gear or sprocket 78 over which a chain or belt 79 passes for transmitting motion from the shaft 73 to the cradle 15.

Thus it will be seen that by operating the shaft 73, the cradle 15 will be rotated in its bearings and at the same time the draw off mechanism will also be actuated.

Figure 8:
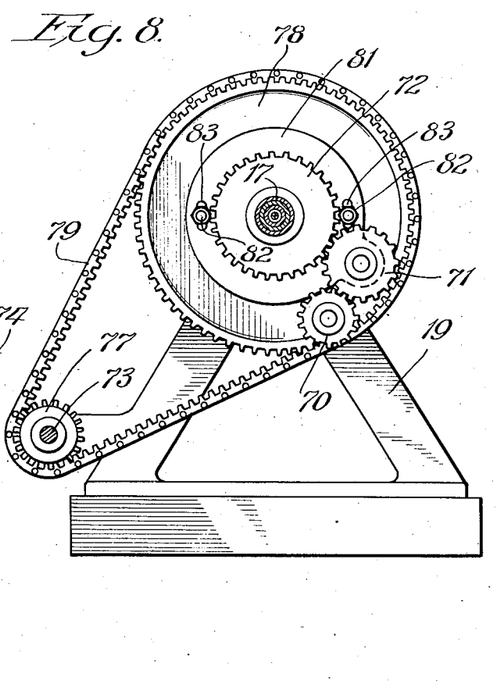
Figure 8 is a view taken on line 8—8, Figure 2.

To vary the speed of operation of the draw off mechanism the gear 71 is adapted to be removed and another gear substituted therefor. In order to accomplish this the gear 71 (see particularly Figure 8) is mounted in an adjustable bearing which is preferably carried by a plate or member 81 adjustably mounted upon the gear 78, preferably through the medium of bolt and slot connections 82—83.

By loosening the fastening bolts 82 the supporting plate or member 81 carrying the bearing 80 may be rotatably displaced with respect to the gear 78 so as to move the bearing 80 of the gear 71 toward or away from the gear 70 a sufficient distance to permit of the interchanging of the gear 70 with another gear of the desired diameter. The fastening devices 82 may then be tightened so that the gears will be held in mesh.

Figure 3:
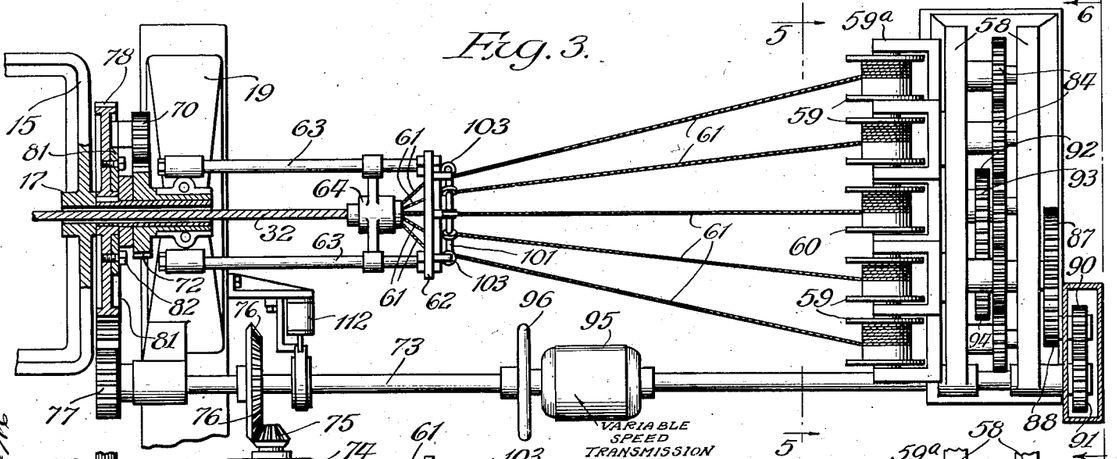
Figure 3 is a top plan view partly in section of the other end of the machine.
Figure 4:
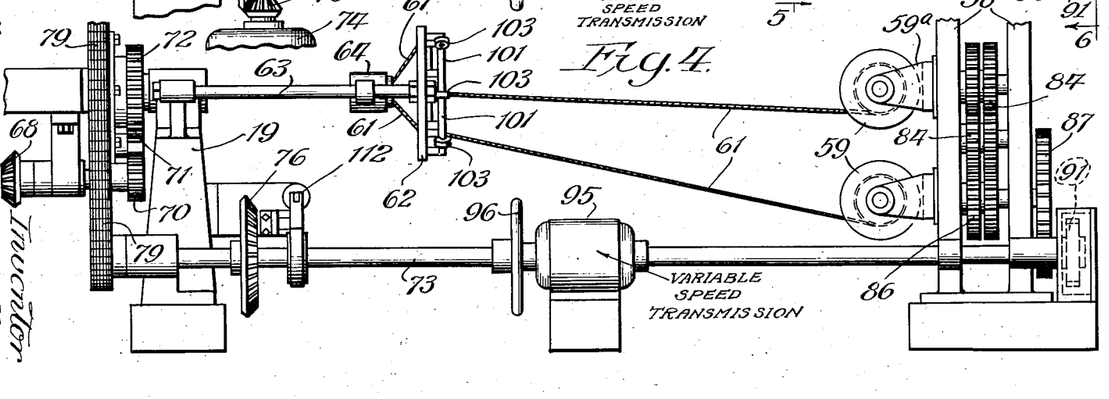
Figure 4 is a side elevation of Figure 3.
Figure 5:
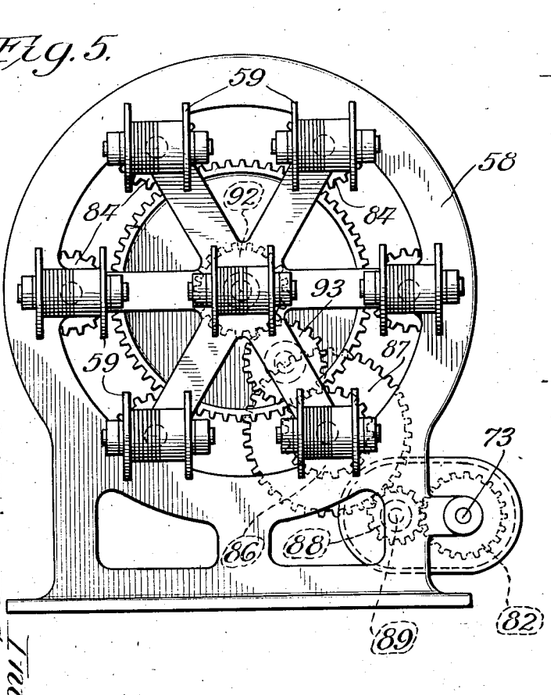
Figure 5 is a view taken on line 5—5, Figure 3.
Figure 6:
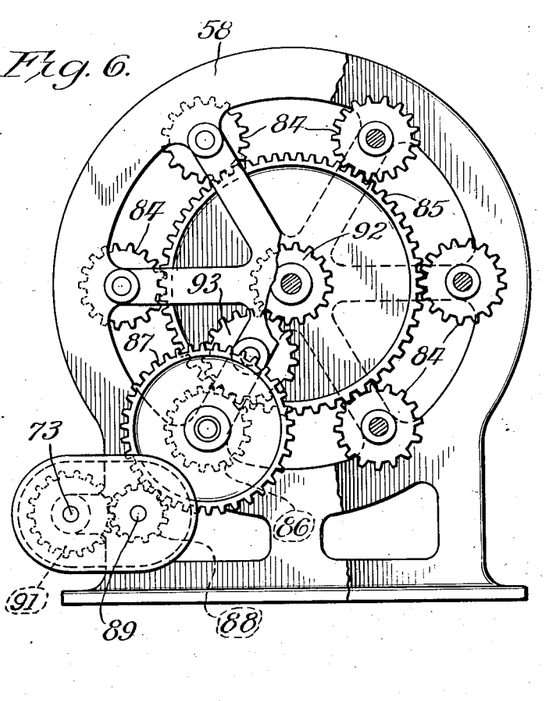
Figure 6 is a view taken on line 6—6, Figure 3.
Figure 7:
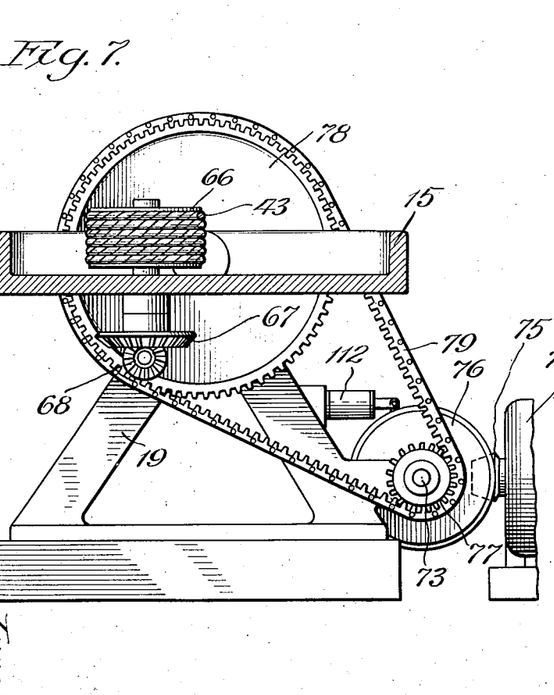
Figure 7 is a view taken on line 7—7, Figure 2.

Connected with each of the reel or bobbin cradles 59ª is a gear 84 all of which mesh with another gear 85 for simultaneously rotating the reels about their own axes. The gear 85 meshes with another gear 86 connected with the shaft of one of the reels or bobbins 59, and this gear 86 in turn is connected with a gear 87 which meshes with a gear 88 carried by a shaft 89. It will therefore be seen that when the gear 87 is rotated each of the bobbins 59—60 will be rotated and about fixed axes transverse to the axes of rotation of the respective bobbins. Connected with the shaft 89 is another gear 90 (see particularly Figure 3) which in turn meshes with a gear 91 carried by the drive shaft 73. The cradle of the reel or bobbin 60 has connected with it for rotation therewith a gear 92 which meshes with an idle gear 93, which in turn meshes with another gear 94 that is connected with the gear 87 for rotation therewith. Thus it will be seen that during the operation of the machine the bobbin cradles will be rotated about their own axes. By interchanging the gears 90 and 91 with other gears of different diameters it will be manifest that the speed of rotation of the spools or bobbins 59 may be varied.

Arranged in the shaft 73 and at any suitable point is a variable speed transmission device designated generally by the reference numeral 95 and is diagrammatically illustrated. Any suitable variable speed transmission device of any well known construction may be employed for the purpose, suffice it to say that there is provided an adjusting hand wheel device 96 by means of which the speed of rotation of the cradle with respect to the speed of rotation of the bobbins 59 may be produced so that with this construction it is possible to rotate the reels or bobbins 59 about their axes at the same rate of speed as the speed of rotation of the cradle about its axis, by adjusting the speed transmission mechanism so that one will rotate faster than the other, and either may be caused to rotate at a slower rate of speed in accordance with the nature of the cable or strand it is desired to produce, that is to say whether the cable or strand shall possess a great or small amount of life, or whether there will be produced a product known as a live or dead cable strand.

Any suitable means may be provided for automatically stopping the machine when any of the wires or strands 61 break or run out.

Figures 9, 10:
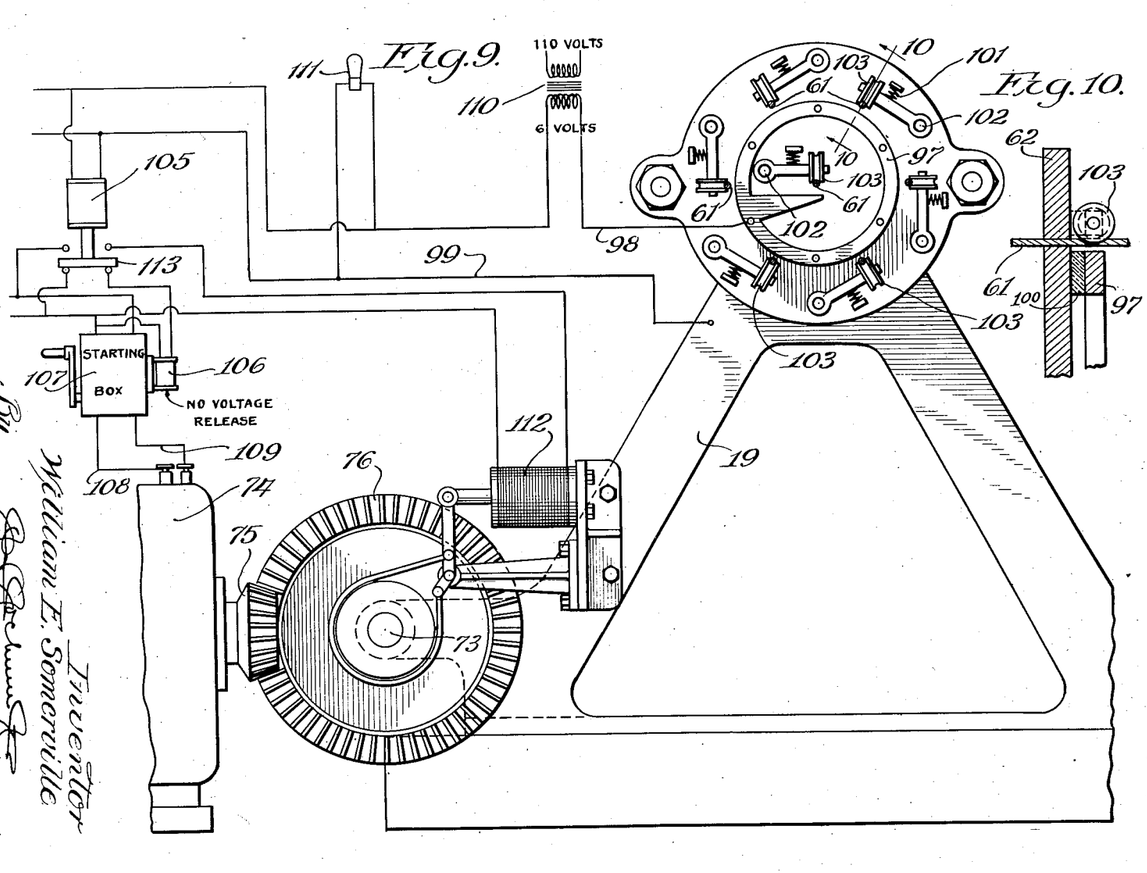
Figure 9 is a diagrammatic view partly in elevation and partly broken away, showing the means for automatically controlling the operation of the machine.
Figure 10 is a detail sectional view taken on line 10—10, Figure 9.

A suitable and efficient means for this purpose embodies an electric control device diagrammatically illustrated in Figures 9 and 10 of the drawings. This control device preferably comprises a collector ring 97 to which is connected a supply conductor 98 running from any suitable source of supply of electric current (not shown).

The other conductor 99 of the supply is grounded preferably to the frame of the machine, such as one of the supporting bearings 19, and the collector ring is preferably supported by means of the die plate 62 and is insulated therefrom as at 100.

Contact devices 101 such as spring controlled arms pivotally mounted as at 102 are provided to form a connection between the die plate 62 and the collector ring 97. One of these contact devices is provided for each of the strands or wires 61 of the rope or cable and preferably embodies a roller 103 rotatably mounted upon the arm, and which roller engages and is supported by the wire or strand 61. When the wires or strands are in contact they will support the respective rollers 103 or hold them against the stress of their springs and out of contact with the collector ring 97, but when one of the strands breaks or is paid out the individual roller 103 resting thereagainst will, through the medium of its spring 104, cause the roller to move into contact with the collector ring 97 to complete the circuit, through the conductors 98 and 99. The circuit has arranged therein a circuit breaker of any ordinary and well known type, here shown, as a solenoid, diagrammatically illustrated at 105. This circuit breaker controls the "no voltage release" magnet diagrammatically illustrated as at 106, of a starting box for the motor, also diagrammatically illustrated at 107.

The conductors 108—109 connect the starting box 107 with the motor 74.

Arranged also in the line is a transformer designated generally by the reference numeral 110 to reduce the voltage so as to prevent shock and render the device safe for the operator. Within the circuit may be arranged a signal light 111 and a magnetic actuating brake device, diagrammatically illustrated at 112, so as to brake the motor at the same time that the motor is being stopped.

With this construction it will be manifest that when the machine is in an operating condition all of the rollers 103 will be held out of engagement with the collector ring 97 by means of the wires 61, and the core 113 of the solenoid will complete the circuit through the starting box to the motor, causing the machine to operate.

When, however, one of the wires 61 breaks or is paid out its respective roller 103, through the medium of the respective spring 104, will cause the roller to engage the collector ring 97 and thereby complete the circuit through the solenoid to move the core of the solenoid in a direction to break the circuit through the motor and at the same time cause the magnetic brake device 112 to operate to stop the motor. At the same time the "no voltage release" magnet 106 will be actuated to stop the motor 74.

The control devices, other than the collector ring and the contacts 101—103, are of any ordinary and well known construction suitable for the purpose and operate in the same manner that the ordinary and well known devices for this purpose, operate.

It will therefore be seen that when any of the wires 61 break or run out, the control contact will move into engagement with the collector ring. This will close the circuit through the light 111, to light the same, and the circuit breaker (the solenoid 105) will also be operated, which in turn will operate through the "no voltage release" 106 and the starting box to stop the motor.

At the same time the magnetic brake will be applied.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. In a machine for making wire rope or cable, the combination of a rotatable cradle, a reel mounted upon the cradle and upon which reel the cable is wound, means for rotating the cradle, a guiding member upon the cradle for guiding the cable to the reel, means for reciprocating the guiding member in directions lengthwise of the axis of said reel, and a counterbalancing member upon the cradle movable in directions lengthwise of the axis of said reel and in opposition to the said guiding member for balancing the reel and cable and said guiding member with respect to the reel.

2. In a machine for making wire rope or cable, the combination of a rotatable cradle, a reel mounted upon the cradle and upon which reel the cable is wound, means for rotating the cradle, a guiding member upon the cradle for guiding the cable to the reel, means for moving said guiding member back and forth in directions lengthwise of the axis of the reel, a counterbalancing member also upon the cradle, means for moving the counterbalancing member back and forth in directions lengthwise of the axis of the reel and in opposite directions with respect to the directions of movement of and as the guiding member moves, and means for simultaneously and automatically imparting intermittent steps of movement to the said guiding and counterbalancing members.

3. In a machine for making wire rope or cable, the combination of a rotatable cradle, a reel mounted upon the cradle and upon which reel the cable is wound, means for rotating the cradle, a guiding member upon the cradle for guiding the cable to the reel, means for moving said guiding member back and forth in directions lengthwise of the axis of the reel, a counterbalancing member also upon the cradle, means for moving the counterbalancing member back and forth in directions lengthwise of the axis of the reel and in opposite directions with respect to the directions of movement of and as the guiding member moves, means for simultaneously and automatically imparting intermittent steps of movement to the said guiding and counterbalancing members, and means adapted to be set to vary the extent of each step of movement of the guiding and counterbalancing members.

4. In a machine for making wire rope or cable, the combination of a rotatable cradle, a reel mounted upon the cradle and upon which reel the cable is wound, means for rotating the cradle, a guiding member upon the cradle for guiding the cable to the reel, means for moving said guiding member back and forth in directions lengthwise of the axis of the reel, a counterbalancing member also upon the cradle, means for moving the counterbalancing member back and forth in directions lengthwise of the axis of the reel and in opposite directions with respect to the directions of movement of and as the guiding member moves, means for simultaneously and automatically imparting intermittent steps of movement to the said guiding and counterbalancing members, and manual means for initially adjusting or positioning the said guiding member with respect to the reel.

5. In a machine for making wire rope or cable, the combination of a rotatable cradle, a reel mounted upon the cradle and upon which reel the cable is wound, means for rotating the cradle, a guiding member upon the cradle for guiding the cable to the reel, means for reciprocating the guiding member in directions lengthwise of the axis of said reel, means for imparting intermittent steps of operative movement to the last said means, said intermittent operating means embodying a rotatable ratchet member, a bodily rotatable pawl co-operating with said ratchet member, and a pair of co-operating cam members for causing the pawl to be moved into a position to engage the ratchet and to be moved out of engagement therewith.

6. In a machine for making wire rope or cable, the combination of a rotatable cradle, a reel mounted upon the cradle and upon which reel the cable is wound, means for rotating the cradle, a guiding member upon the cradle for guiding the cable to the reel, means for reciprocating the guiding member in directions lengthwise of the axis of said reel, means for imparting intermittent steps of operative movement to the last said means, said intermittent operating means embodying a rotatable ratchet member, a bodily rotatable pawl co-operating with said ratchet member, a pair of co-operating cam members for causing the pawl to be moved into a position to engage the ratchet and to be moved out of engagement therewith, and means whereby said cam members may be adjusted axially, one with respect to the other to vary the time and the extent of operative movement of the pawl with respect to the ratchet during the cycle of operation of the machine.

7. In a machine for making wire rope or cable, the combination of a rotatable cradle, a reel mounted upon the cradle and upon which reel the cable is wound, means for rotating the cradle, a guiding member upon the cradle for guiding the cable to the reel, means for reciprocating the guiding member in directions lengthwise of the axis of said reel; means for imparting intermittent steps of operative movement to the last said means, said intermittent operating means embodying a rotatable ratchet member, a bodily rotatable pawl co-operating with said ratchet member, a pair of co-operating cam members for causing the pawl to be moved into a position to engage the ratchet and to be moved out of engagement therewith, and means whereby the pawl will be responsive in its bodily rotation to the rotation of said reel.

WILLIAM E. SOMERVILLE.